A. A. Maxwell.
Excavator.
No. 72,411. Patented Dec. 17, 1867.
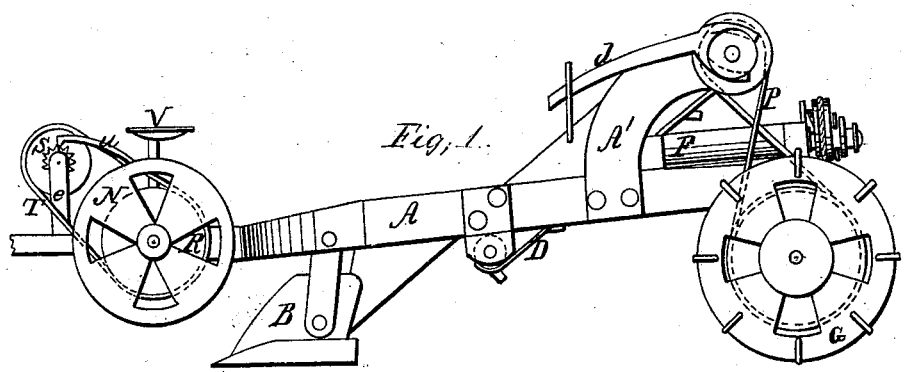
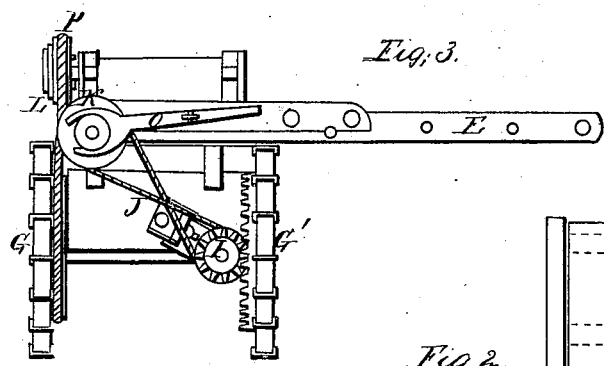
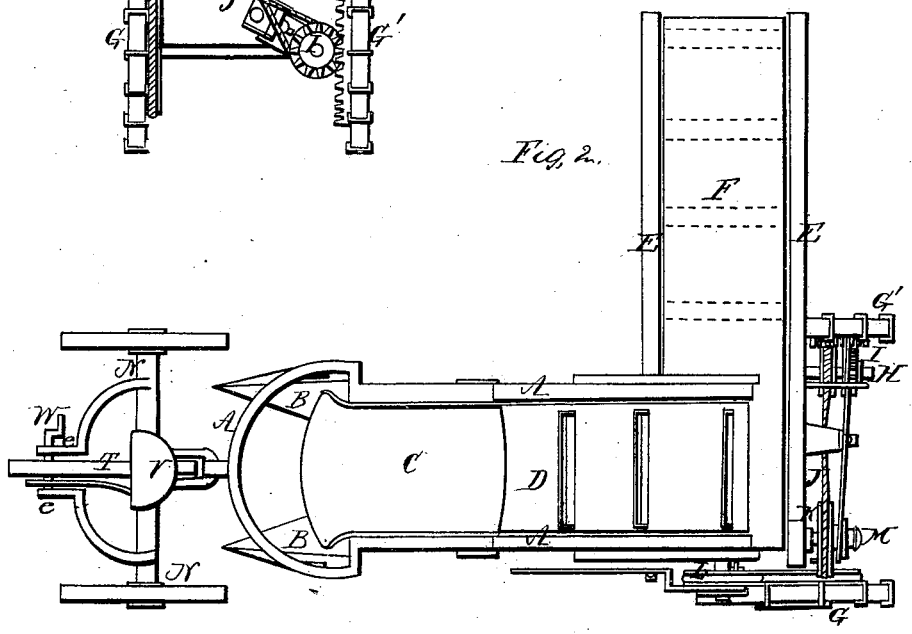
Witnesses:
A. A. Yeatman
Cornelius C.
Inventor:
Arthur A. Maxwell
per
Alexander F. Mason
Atty.

United States Patent Office.

ARTHUR A. MAXWELL, OF PRATT, OHIO.

Letters Patent No. 72,411, dated December 17, 1867.

IMPROVED GRADING AND DITCHING-MACHINE.

*The Schedule referred to in these Letters Patent and making part of the same.*

TO ALL WHOM IT MAY CONCERN:

Be it known that I, ARTHUR A. MAXWELL, of Pratt, in the county of Shelby, and in the State of Ohio, have invented certain new and useful Improvements in Grading and Ditching-Machines; and do hereby declare that the following is a full, clear, and exact description thereof, reference being had to the accompanying drawings, and to the letters of reference marked thereon.

In the annexed drawings, making part of this specification, A represents the frame of the machine, which is constructed in a very strong and substantial manner, and supported at its rear end upon the wheels G G'. B B represent two ploughs, which support the forward end of the frame. The mould-boards of these ploughs turn inward. The forward end of the frame is connected, by means of a clevis, to a wheel R. The clevis embraces the wheel, and a pin passes through the wheel, near its periphery, and through the clevis, confining them together. This wheel R is on the shaft of a truck, N. The driver's seat is also upon this truck. A shaft, W, with a crank-axle upon it, lies and has its bearings in two uprights e e, which are erected upon the truck, and upon this shaft is a wheel, S, and also a small ratchet-wheel. A band, T, passes from wheel S to and around wheel R. The driver, sitting in the seat V, by turning the crank of shaft W, causes, through wheel S and band T, the wheel R to make a partial revolution backward and forward, for the purpose of raising and lowering the forward end of the frame A. The dog U catches into the ratchet-wheel on shaft W, to station said shaft, and consequently the frame A, in any desired position. C represents an inclined plane, within the frame A, and running from a level with the bottoms of the ploughs up, at an angle of about forty-five degrees with the frame, until it meets an endless belt, D. The endless belt D revolves around suitable rollers, which are secured in the frame, and has upon its outer face slats, so that it will carry up earth when deposited upon it.

At right angles to and in rear of frame A is a frame, E, which has within it an endless belt, F, which revolves around suitable rollers. The belt F is situated below the belt D, so that the earth which is carried up by the belt D can be deposited upon it. The belt F is revolved by means of a band, J, which passes around a pulley, K, upon one of the end rollers of the belt. The band J passes around a pulley upon shaft H, and shaft H is driven by means of a gear-wheel on the inner face of the driving-wheel G', which plays into a pinion, I, upon shaft H. The belt F is revolved so as to carry off the earth deposited upon it by belt D. Belt D is driven by means of a band, P, which passes from a pulley on the inner face of driving-wheel G to and around a pulley, L, on one of the end rollers of this belt. Suitable levers, as seen at o and d, are used for throwing the pulleys which communicate motion to the belts out and in gear. These may be arranged in any of the known and usual ways.

In using this machine, power is applied to the truck N, which drags the machine behind it. The ploughs enter and loosen up the earth, and the earth between the ploughs, thus loosened, passes up the inclined plane C on to the belt D, and is carried up, and, by belt D, emptied upon the belt F. This latter belt carries the earth away to one side, and out of the way of the machine.

Having thus fully described my invention, what I claim as new, and desire to secure by Letters Patent, is—

The frames A E, ploughs B B, inclined plane C, belts D F, wheels R S, band T, and truck N, with crank-shaft W, the whole arranged and combined with their respective devices for operating in the manner substantially as and for the purposes specified.

In testimony that I claim the foregoing, I have hereunto set my hand, this 9th day of September, 1867.

ARTHUR A. MAXWELL.

Witnesses:
 H. M. AILES,
 FIELDING C. JACKSON.